(12) United States Patent
Clark et al.

(10) Patent No.: US 9,957,897 B2
(45) Date of Patent: May 1, 2018

(54) GIMBAL TUBE SYSTEMS FOR TANGENTIAL ONBOARD INJECTORS

(71) Applicant: UNITED TECHNOLOGIES CORPORATION, Farmington, CT (US)

(72) Inventors: Thomas E. Clark, Sanford, ME (US); Jeffrey Vincent Anastas, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 463 days.

(21) Appl. No.: 14/662,581

(22) Filed: Mar. 19, 2015

(65) Prior Publication Data

US 2016/0273454 A1  Sep. 22, 2016

(51) Int. Cl.
| | | |
|---|---|---|
| *F02C 1/00* | (2006.01) | |
| *F02C 7/22* | (2006.01) | |
| *F01D 5/08* | (2006.01) | |
| *F01D 9/06* | (2006.01) | |
| *F02C 7/18* | (2006.01) | |

(52) U.S. Cl.
CPC .............. *F02C 7/22* (2013.01); *F01D 5/081* (2013.01); *F01D 9/06* (2013.01); *F02C 7/18* (2013.01); *F05D 2220/32* (2013.01); *F05D 2230/60* (2013.01); *F05D 2240/10* (2013.01); *F05D 2240/81* (2013.01); *F05D 2260/30* (2013.01); *Y02T 50/676* (2013.01)

(58) Field of Classification Search
USPC ........ 60/39.31, 39.32, 39.36, 734, 737, 739, 60/740, 746, 747, 748, 744, 745
See application file for complete search history.

(56) References Cited

U.S. PATENT DOCUMENTS 4,454,711 A * 6/1984 Ben-Porat .................. F23R 3/10
60/748
5,771,696 A * 6/1998 Hansel .................... F23R 3/283
60/739
5,916,142 A * 6/1999 Snyder .................... F23C 7/004
60/740

(Continued)

FOREIGN PATENT DOCUMENTS

| EP | 0735238 A1 | 10/1996 |
|---|---|---|
| EP | 1079069 A2 | 2/2001 |
| WO | 33036048 A1 | 5/2003 |

OTHER PUBLICATIONS

European Search Report for EP 16 15 1948.

*Primary Examiner* — Binh Q Tran
(74) *Attorney, Agent, or Firm* — Cantor Colburn LLP

(57) ABSTRACT

A gimbal tube system for an onboard injector (OBI) includes a transfer tube having a first transfer tube end that can be mounted to an inner diameter of a stator platform and a second transfer tube end defining a transfer tube pivot connector. The system also includes a gimbal tube including a first gimbal tube end that defines a gimbal tube pivot connector that can movably mount to the transfer tube pivot connector such that the gimbal tube and the transfer tube can move relative to each other at a pivot joint defined between the transfer tube and the gimbal tube. The gimbal tube further includes a second gimbal tube end defining a nozzle that can be inserted into the OBI.

20 Claims, 3 Drawing Sheets

(56) References Cited

U.S. PATENT DOCUMENTS

| | | | |
|---|---|---|---|
| 7,047,728 B2 * | 5/2006 | Yasui | F02D 41/1494 60/274 |
| 7,591,136 B2 * | 9/2009 | Bernier | F23R 3/14 60/740 |
| 8,726,667 B2 * | 5/2014 | Tanner | F23C 5/02 239/587.1 |
| 9,618,209 B2 * | 4/2017 | Bandaru | F23R 3/28 |
| 9,689,573 B2 * | 6/2017 | Potts | F23R 3/283 |

* cited by examiner

GIMBAL TUBE SYSTEMS FOR TANGENTIAL ONBOARD INJECTORS

STATEMENT OF GOVERNMENT RIGHTS

This invention was made with government support under contract no. FA8650-09-D-2923-0021 awarded by the Air Force. The government has certain rights in the invention.

BACKGROUND

1. Field

The present disclosure relates to tangential onboard injectors, more specifically to gimbal tube systems for tangential onboard injectors.

2. Description of Related Art

Traditional tangential onboard injector (TOBI) systems for gas turbine engines include a tube (referred to as a gimbal tube) that routes airflow from a stator platform to a TOBI. The TOBI, which is a full hoop, is moveably mounted to the stator platform and injects airflow into an inner diameter portion of the turbomachine to cool components thereof. Since the TOBI is configured to move relative to the stator platforms, traditional gimbal tubes are configured to be mounted to an inner diameter portion of the stator platform and to movably interface with an outer diameter portion of the TOBI in a beveled orifice defined in the TOBI.

These beveled orifices require complex, precision manufacturing of the TOBI and air pressure must be sufficient to force the gimbal tube against the TOBI to maintain a gimbaled connection between the gimbal tube and the TOBI. Also, traditional TOBI designs require large rotor spacing and/or complex vane rail and TOBI geometry. For example, traditional TOBI designs require more room than what is typically allocated in certain engine models. Such conventional methods and systems have generally been considered satisfactory for their intended purpose. However, there is still a need in the art for improved gimbal tube systems for TOBIs. The present disclosure provides a solution for this need.

SUMMARY

A gimbal tube system for an onboard injector (OBI) (e.g., a tangential onboard injector (TOBI)) includes a transfer tube having a first transfer tube end that can be mounted to an inner diameter of a stator platform and a second transfer tube end defining a transfer tube pivot connector. The system also includes a gimbal tube including a first gimbal tube end that defines a gimbal tube pivot connector that can movably mount to the transfer tube pivot connector such that the gimbal tube and the transfer tube can move relative to each other at a pivot joint defined between the transfer tube and the gimbal tube. The gimbal tube further includes a second gimbal tube end defining a nozzle that can be inserted into the OBI.

The second transfer tube end can include a first chamfered surface. The first gimbal tube end can include a second chamfered surface that that can receive the first chamfered surface in a pivoting relationship.

The system can further include a spring member that seats the gimbal tube to against the transfer tube. The spring member can mount to the gimbal tube and the OBI to press the gimbal tube to the transfer tube. The spring member can include a higher spring force then a maximum force created by airflow through the gimbal tube system. The spring member can include a living hinge spring and/or any other suitable spring.

The living hinge spring can define a first hole that can receive a portion of the gimbal tube. The living hinge spring can define a second hole that can receive a lip defined on the OBI.

An onboard injection system includes an onboard injector (OBI) (e.g., a tangential onboard injector (TOBI)) defining a plurality of gimbal tube orifices that can each receive a gimbal tube. A respective gimbal tube system as described above is operatively disposed on each respective gimbal tube orifice of the OBI to supply the OBI with airflow from a stator vane A method for installing an onboard injection system includes disposing a spring member on an onboard injector (OBI) (e.g., a tangential onboard injector (TOBI)), and inserting a nozzle of a gimbal tube into the OBI and in communication with the spring member thereby creating a spring force between the OBI and the gimbal tube. The method can further include disposing a pivot connector of a transfer tube into a pivot connector of the gimbal tube after attaching the transfer tube to a stator platform.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
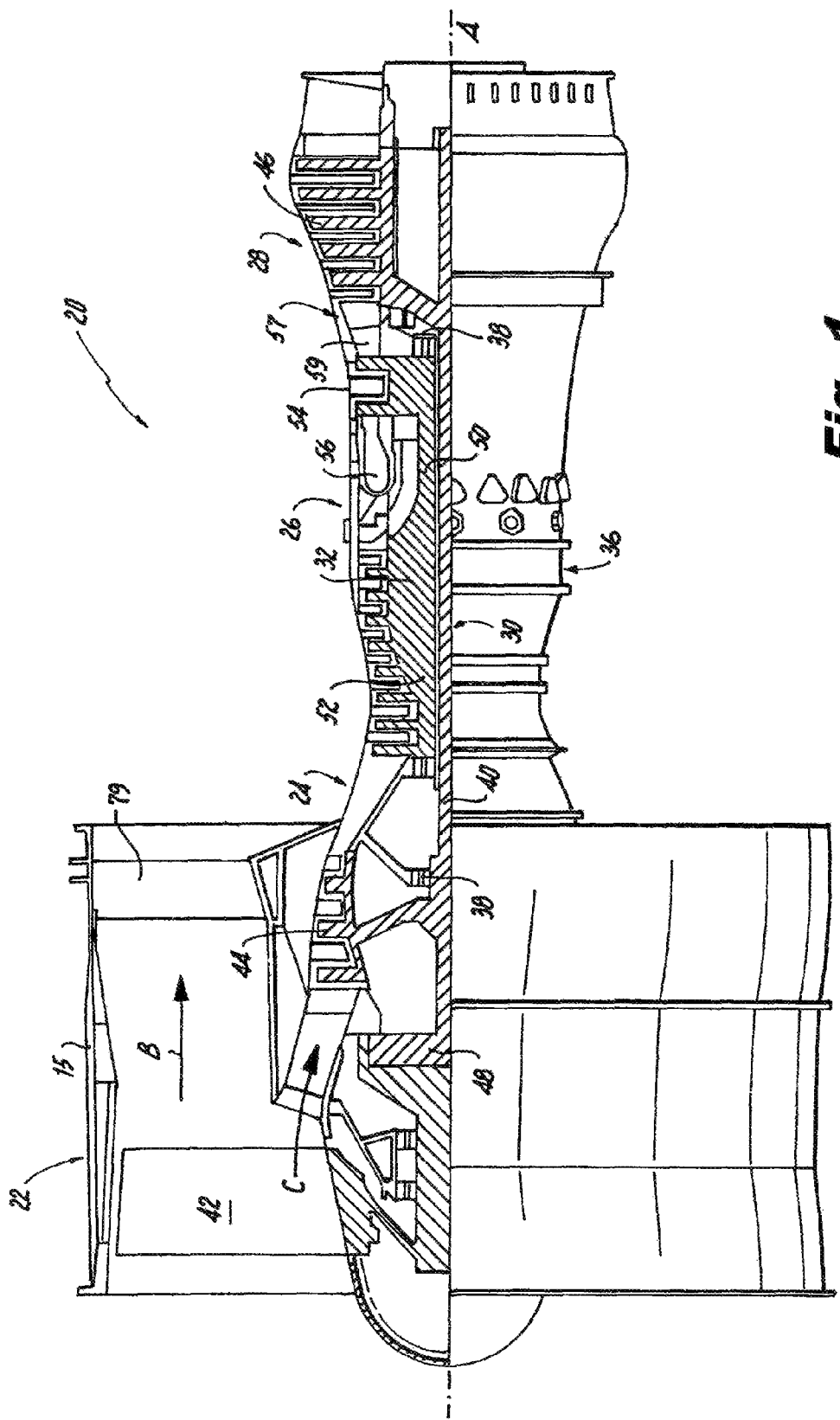
FIG. 1 is a schematic view of an embodiment of a gas turbine engine in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 2 and is designated generally by reference character 200. Other embodiments and/or aspects of this disclosure are shown in FIGS. 1 and 3A-3C. The systems and methods described herein can be used to reduce space used by cooling systems in a gas turbine engine and to reduce manufacturing complexity thereof.

Figure 2:
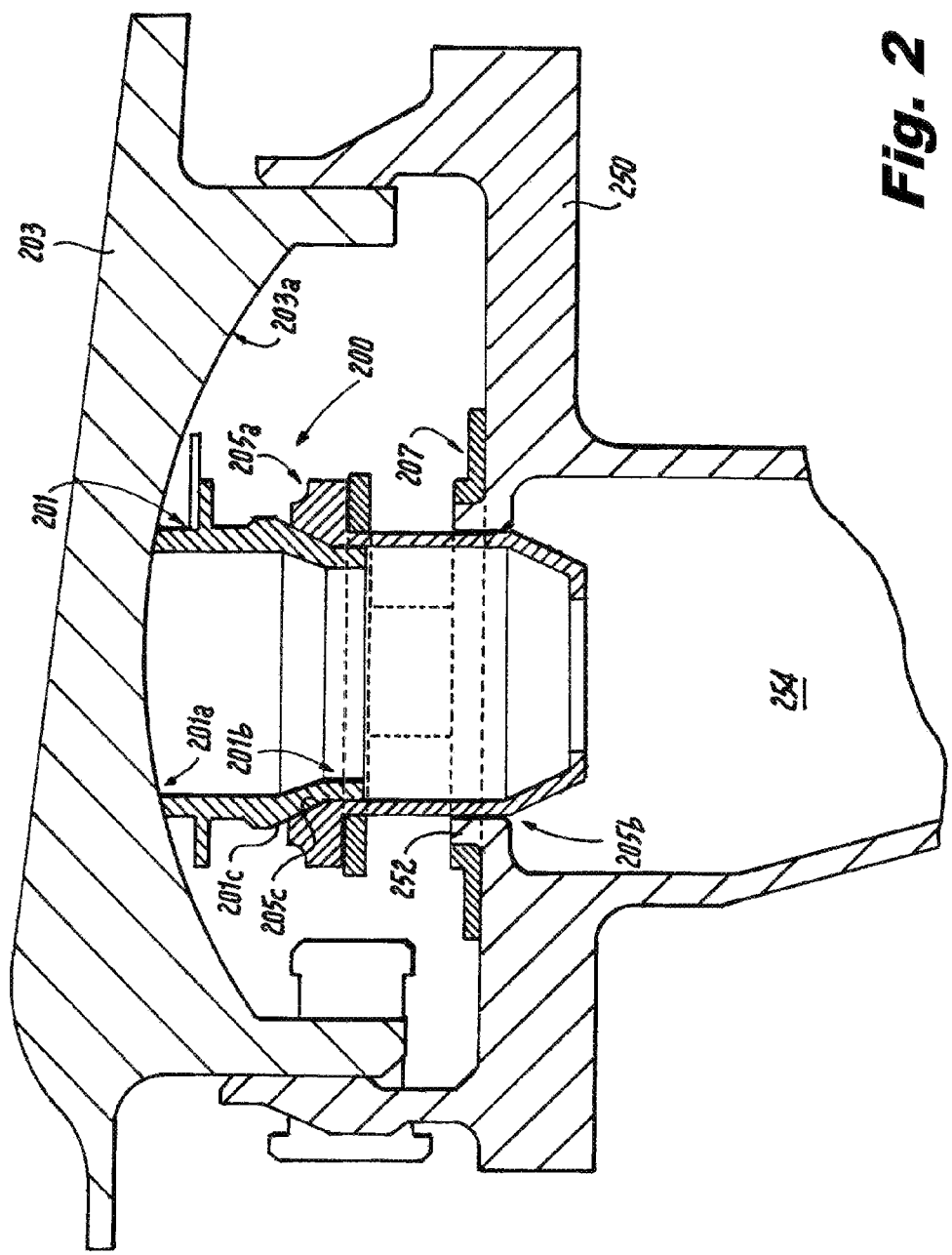
FIG. 2 is a partial cross-sectional view of an embodiment of a tangential onboard injector (TOBI) and gimbal tube system in accordance with this disclosure, showing a gimbal tube system disposed between a stator and the TOBI.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a gear system 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane 79 ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Referring to FIG. 2, a gimbal tube system 200 for a tangential onboard injector (TOBI) 250 includes a transfer tube 201 having a first transfer tube end 201a that can be mounted to an inner diameter 203a of a stator platform 203. The transfer tube 201 also includes a second transfer tube end 201b defining a transfer tube pivot connector. The system 200 also includes a gimbal tube 205 including a first gimbal tube end 205a that defines a gimbal tube pivot connector that can movably mount to the transfer tube pivot connector such that the gimbal tube 205 and the transfer tube 201 can move relative to each other at a pivot joint defined by the interaction of the transfer tube 201 and the gimbal tube 205. The gimbal tube 205 further includes a second gimbal tube end 205b defining a nozzle that can be inserted into the TOBI 250.

As shown, the second transfer tube end 201b can include a first chamfered surface 201c. The first chamfered surface 201c can be a linear chamfer, a non-linear chamfer, or any other suitable chamfer to allow a pivot joint with the gimbal tube 205. In this regard, the first gimbal tube end 205a can include a second chamfered surface 205c that that can receive the first chamfered surface 201c in a pivoting relationship. It is contemplated that the first chamfered surface 201c and the second chamfered surface 205c are different from each other (e.g., a linear chamfer and a non-liner chamfer) to enable pivoting, but matching non-linear chamfers are also contemplated (e.g., such as a ball-joint).

The system 200 can further include a spring member 207 that can to press the gimbal tube 205 to against the transfer tube 201. As shown, the spring member 207 can mount to the gimbal tube 205 and the TOBI 250 to press the gimbal tube 205 to the transfer tube 201 to keep the gimbal tube 205 and the transfer tube 201 in pivotable communication. In order to prevent the gimbal tube 205 from separating from the transfer tube 201, the spring member 207 can have a suitable spring constant to provide a higher spring force then a maximum force created by airflow through the gimbal tube system 200.

Figure 3A:
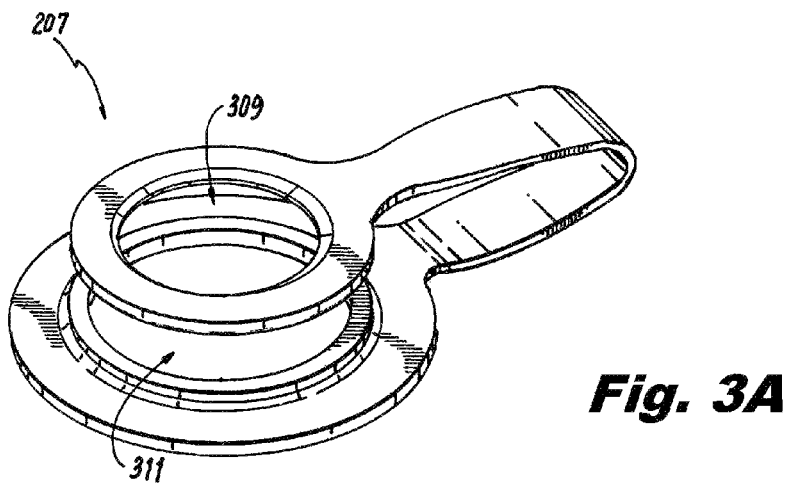
FIG. 3A is a perspective view of an embodiment of a spring member in accordance with this disclosure.
Figure 3B:
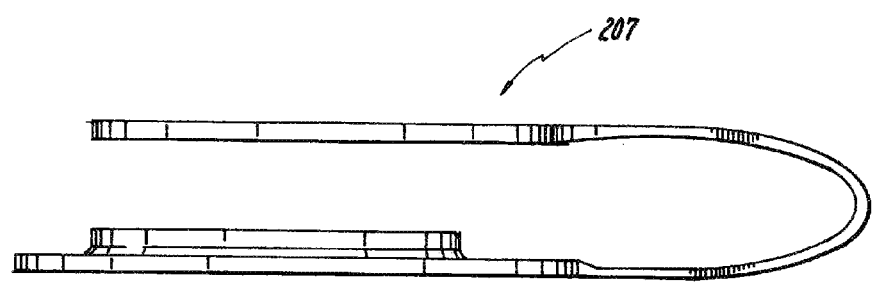
FIG. 3B is a side elevation view of the spring member of FIG. 3A.
Figure 3C:
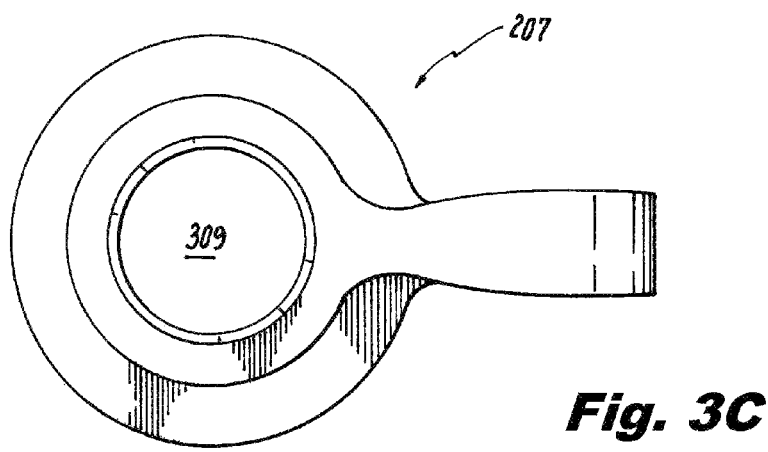
FIG. 3C is a plan view of the spring member of FIG. 3A.

Referring to FIGS. 3A-3C, in certain embodiments, the spring member 207 can include a living hinge spring that can include, e.g., a folded two-prong profile. The spring member 207 can define a first hole 309 that can receive a portion of the gimbal tube 205. The spring member 207 can define a second hole 311 that can receive a lip 252 (e.g., see FIG. 2) defined on the TOBI 250. It is contemplated that any other suitable spring may be utilized (e.g., a spiral spring coaxially disposed around the lip 252 and the gimbal tube 205).

Referring to FIG. 2, the TOBI 250 can be an annular full hoop structure that defines one or more gimbal tube orifices 254 that are shaped to receive a gimbal tube 205. One or more gimbal tube systems 200 as described above can be operatively disposed on the TOBI 250 to supply the TOBI 250 with airflow from a stator vane through stator platform 203.

A method for installing tangential onboard injection system includes disposing a spring member 207 on a TOBI 250 and inserting a nozzle of a gimbal tube 205 into the TOBI 250 while in communication with the spring member 207 thereby creating a spring force between the TOBI 250 and the gimbal tube 205. The method can further include disposing a pivot connector of a transfer tube 201 into a pivot connector of the gimbal tube 205 after attaching the transfer tube 201 to a stator platform 203.

As described above, the gimbal tube system 200 allows for a pivot joint to be created separate from the TOBI 250 and for the pivot connection between the gimbal tube 205 and the transfer tube 201 to be kept together using spring force from spring member 207 instead of relying on suitable airflow as in traditional systems. This allows for the TOBI 250 to be manufactured with a simpler design and allows for the overall system to be reduced in size in both the radial and axial directions while ensuring that the gimbal tube 205 maintains connection with the transfer tube 201 and the TOBI 250.

More specifically, the system 200 allows simplified TOBI 250 mating features to the gimbal tube 205 compared to traditional systems. For example, traditional systems require roughly 0.200" of axial cast-to-machined transition features near the gimbal tube/TOBI chamfer. These features are out of plane to the gimbal tubes and vary in radial height. As a consequence, these features require radial space for the outer diameter portions of the TOBI (the web near the TOBI chamfer to accommodate the traditional gimbal tube) in order to accommodate out-of-plane features which would otherwise extend beyond the TOBI outer diameter hoop. The disclosed gimbal system 200 allows these TOBI out-of-plane features to be removed, reducing axial and radial space in the TOBI 250. The disclosed system 200 allows the gimbal mate-face web on the TOBI to be in-line with the outer diameter portions of the, which eliminates the need for cast-machined radial step transitions. This allows the TOBI outer diameter hoop to be conical, and as a result the axial space may be reduced roughly 0.200" by eliminating the step transitions.

While the above description describes TOBIs, it is understood by those skilled in the art the methods, systems, and devices of this disclosure can be applied to any suitable onboard injector (e.g., a radial onboard injector (ROBI)).

The methods, systems, and devices of the present disclosure, as described above and shown in the drawings, provide for gimbal tube systems and on board injectors with superior properties including improved reliability, simplicity, and reduced size. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A gimbal tube system for a tangential onboard injector (TOBI), comprising:
    a transfer tube including a first transfer tube end mounted to an inner diameter of a stator platform and a second transfer tube end defining a transfer tube pivot connector; and
    a gimbal tube including a first gimbal tube end that defines a gimbal tube pivot connector movably mounted to the transfer tube pivot connector such that the gimbal tube and the transfer tube are pivotable relative to each other at a pivot joint defined between the transfer tube and the gimbal tube, wherein the gimbal tube further includes a second gimbal tube end defining a nozzle inserted into the TOBI.

2. The system of claim 1, wherein the second transfer tube end includes a first chamfered surface.

3. The system of claim 2, wherein the first gimbal tube end includes a second chamfered surface that receives the first chamfered surface in a pivoting relationship.

4. The system of claim 1, further including a spring member that presses the gimbal tube to against the transfer tube.

5. The system of claim 4, wherein the spring member mounts to the gimbal tube and the TOBI to press the gimbal tube to the transfer tube.

6. The system of claim 5, wherein the spring member includes a spring constant to provide a higher spring force then a maximum force created by airflow through the gimbal tube system.

7. The system of claim 6, wherein the spring member includes a living hinge spring.

8. The system of claim 7, wherein the living hinge spring defines a first hole to receive a portion of the gimbal tube.

9. The system of claim 8, wherein the living hinge spring defines a second hole that receives a lip defined on the TOBI.

10. A tangential onboard injection system, comprising:
    a tangential onboard injector (TOBI) defining a plurality of gimbal tube orifices receiving a gimbal tube; and
    a gimbal tube system operatively disposed on the TOBI to supply the TOBI with airflow, the gimbal tube system including:
        a transfer tube including a first transfer tube end mounted to an inner diameter of a stator platform and a second transfer tube end defining a transfer tube pivot connector; and
        a gimbal tube including a first gimbal tube end that defines a gimbal tube pivot connector movably mounted to the transfer tube pivot connector such that the gimbal tube and the transfer tube are pivotable relative to each other at a pivot joint defined between the transfer tube and the gimbal tube, wherein the gimbal tube further includes a second gimbal tube end defining a nozzle that is inserted into the TOBI.

11. The system of claim 10, wherein the second transfer tube end includes a first chamfered surface.

12. The system of claim 11, wherein the first gimbal tube end includes a second chamfered surface that receives the first chamfered surface in a pivoting relationship.

13. The system of claim 10, further including a spring member that presses the gimbal tube to against the transfer tube.

14. The system of claim 13, wherein the spring member mounts to the gimbal tube and the TOBI to press the gimbal tube to the transfer tube.

15. The system of claim 14, wherein the spring member includes a spring constant to provide higher spring force then a maximum force created by airflow through the gimbal tube system.

16. The system of claim 15, wherein the spring member includes a living hinge spring.

17. The system of claim 16, wherein the living hinge spring defines a first hole receiving a portion of the gimbal tube.

18. The system of claim 17, wherein the living hinge spring defines a second hole receiving a lip defined on the TOBI.

19. A method for installing a tangential onboard injection system, comprising:
 disposing a spring member on a tangential onboard injector (TOBI); and
 inserting a nozzle of a gimbal tube into the TOBI and in communication with the spring member thereby creating a spring force between the TOBI and the gimbal tube.

20. The method of claim 19, further comprising disposing a pivot connector of a transfer tube into a pivot connector of the gimbal tube after attaching the transfer tube to a stator platform.

* * * * *